(12) United States Patent
Buckingham et al.

(10) Patent No.: US 10,831,805 B1
(45) Date of Patent: *Nov. 10, 2020

(54) VIRTUAL SECURE ROOMS

(71) Applicant: United Services Automobile Association (USAA), San Antonio, TX (US)

(72) Inventors: Thomas Bret Buckingham, Fair Oaks Ranch, TX (US); Bryan Osterkamp, New Braunfels, TX (US); Orlando Coleman, San Antonio, TX (US); Brady Justice, San Antonio, TX (US); Jonathan Neuse, Helotes, TX (US); Sean Thomas, Schertz, TX (US); Michael Slaugh, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 248 days.

This patent is subject to a terminal disclaimer.

(21) Appl. No.: 15/803,500

(22) Filed: Nov. 3, 2017

Related U.S. Application Data

(60) Provisional application No. 62/548,494, filed on Aug. 22, 2017, provisional application No. 62/417,148, filed on Nov. 3, 2016.

(51) Int. Cl.
*G06F 16/34* (2019.01)
*G06F 21/31* (2013.01)
*G06F 11/34* (2006.01)
*G06F 21/53* (2013.01)
*G06F 16/93* (2019.01)

(52) U.S. Cl.
CPC .......... *G06F 16/34* (2019.01); *G06F 11/3438* (2013.01); *G06F 16/93* (2019.01); *G06F 21/31* (2013.01); *G06F 21/53* (2013.01)

(58) Field of Classification Search
CPC ...... G06F 16/34; G06F 16/93; G06F 11/3438; G06F 21/31; G06F 21/53
USPC .......................................................... 726/26
See application file for complete search history.

(56) References Cited

U.S. PATENT DOCUMENTS

| | | | |
|---|---|---|---|
| 9,165,144 B1* | 10/2015 | Goldstein | G06F 21/60 |
| 2005/0105734 A1 | 5/2005 | Buer et al. | |
| 2007/0083915 A1 | 4/2007 | Janakiraman et al. | |
| 2008/0141293 A1* | 6/2008 | Blanchard | H04N 7/163 |
| | | | 725/28 |
| 2013/0344859 A1* | 12/2013 | Abramson | H04M 1/72577 |
| | | | 455/418 |
| 2014/0047556 A1 | 2/2014 | Davis | |

(Continued)

*Primary Examiner* — Kambiz Zand
*Assistant Examiner* — Benjamin A Kaplan
(74) *Attorney, Agent, or Firm* — Fish & Richardson P.C.

(57) ABSTRACT

Implementations of the present disclosure are directed to providing remote access to electronic documents stored in a server system using a virtual secure room, and include actions of authenticating a user at least partially based on credentials the user, at least partially in response to authenticating the user, providing a secure connection between a computing device of the user and the server system, transmitting at least one electronic document for display to the user on the computing device, monitoring the user, while the at least one electronic document is displayed to the user on the computing device, and selectively closing the secure connection in response to one or more of at least one activity and at least one state of the user.

27 Claims, 3 Drawing Sheets

(56) References Cited

U.S. PATENT DOCUMENTS

| | | |
|---|---|---|
| 2014/0181290 A1 | 6/2014 | Wong |
| 2014/0282868 A1 | 9/2014 | Scheller et al. |
| 2014/0304836 A1* | 10/2014 | Velamoor ............ G06F 21/6209 726/28 |
| 2015/0170446 A1* | 6/2015 | Burba ...................... G07C 9/32 340/5.52 |
| 2015/0346937 A1* | 12/2015 | Mahmoudian-Bidgoly ................ G06F 3/0484 715/753 |

* cited by examiner

VIRTUAL SECURE ROOMS

CROSS-REFERENCE TO RELATED APPLICATION

This application claims priority to U.S. Provisional Application Ser. No. 62/417,148, filed Nov. 3, 2016, and 62/548,494, filed on Aug. 22, 2017, the entireties of which are incorporated by referenced into the present disclosure.

BACKGROUND

A secure room is a physical location, at which a person is able to access and view documents, such as confidential documents. For example, a secure room can be set-up to enable a person associated with a first enterprise to review documents associated with a second enterprise, which documents may contain highly confidential information (e.g., customer information, healthcare information, financial information). By way of non-limiting example, secure rooms can be used in the example context of due diligence that is performed in anticipation of a merger or acquisition, investment, loan service transfer, and the like. Secure rooms can include physical assets (e.g., doors, window-less walls, turnstiles, desks, chairs, etc.) to facilitate document review, and to inhibit removal of documents. Secure rooms can require a relatively large capital and physical investment for enterprises (and third-party vendors), and can take significant time (e.g., days, weeks, months) to setup. This inhibits an enterprise's ability to react to unexpected volumes (e.g., several reviewers being required to review documents in a relatively short timeframe).

Third-parties provide software-based solutions to support electronic document review. However, such third-party services require documents to be uploaded to their systems (e.g., a cloud platform provided by the third-party system), and for the enterprises involved to interact with the third-party service. This results in documents being moved off-premise (e.g., from an enterprise's server system to the third-party's server system), and may raise security concerns for enterprises.

SUMMARY

Implementations of the present disclosure are generally directed to providing access to electronic documents in a virtual secure room.

Implementations of the present disclosure can include actions of authenticating a user at least partially based on credentials the user, at least partially in response to authenticating the user, providing a secure connection between a computing device of the user and an on-premise server system, transmitting at least one electronic document for display to the user on the computing device, monitoring the user, while the at least one electronic document is displayed to the user on the computing device, and selectively closing the secure connection in response to one or more of at least one activity and at least one state of the user. Other implementations include corresponding systems, apparatus, and computer programs, configured to perform the actions of the methods, encoded on computer storage devices.

These and other implementations can each optionally include one or more of the following features: determining content to be available for display to the user based on a role of the user, the at least one electronic document including at least a portion of the content; at least a portion of the at least one electronic document is redacted based on the role of the user; monitoring the user includes determining whether the at least one activity is a disallowed activity; the disallowed activity includes one or more of interacting with another user, using a device other than the computing device, and using writing instruments; monitoring the user includes determining whether the at least one state is a disallowed state; the disallowed state includes one or more of an absence of the user from the computing device, and a presence of another user; monitoring the user is based on data provided from one or more ancillary devices; and actions further include determining a location of the computing device, wherein providing a secure connection between a computing device is further in response to the location being an approved location.

The details of one or more implementations are set forth in the accompanying drawings and the description below. Other features and advantages will be apparent from the description and drawings, and from the claims.

DETAILED DESCRIPTION

Implementations of the present disclosure are generally directed to providing access to electronic documents in a virtual secure room. More particularly, implementations of the present disclosure leverage technology to enable remotely located parties to review electronic documents stored in a server system. In some implementations, actions include authenticating a user at least partially based on credentials the user, at least partially in response to authenticating the user, providing a secure connection between a computing device of the user and the server system, transmitting at least one electronic document for display to the user on the computing device, monitoring the user, while the at least one electronic document is displayed to the user on the computing device, and selectively closing the secure connection in response to one or more of at least one activity and at least one state of the user. In general, and as described in further detail herein, implementations of the present disclosure provide, in the absence of physical controls, technological controls that enable remotely located users access to electronic documents, and monitoring of user interactions.

Figure 1:
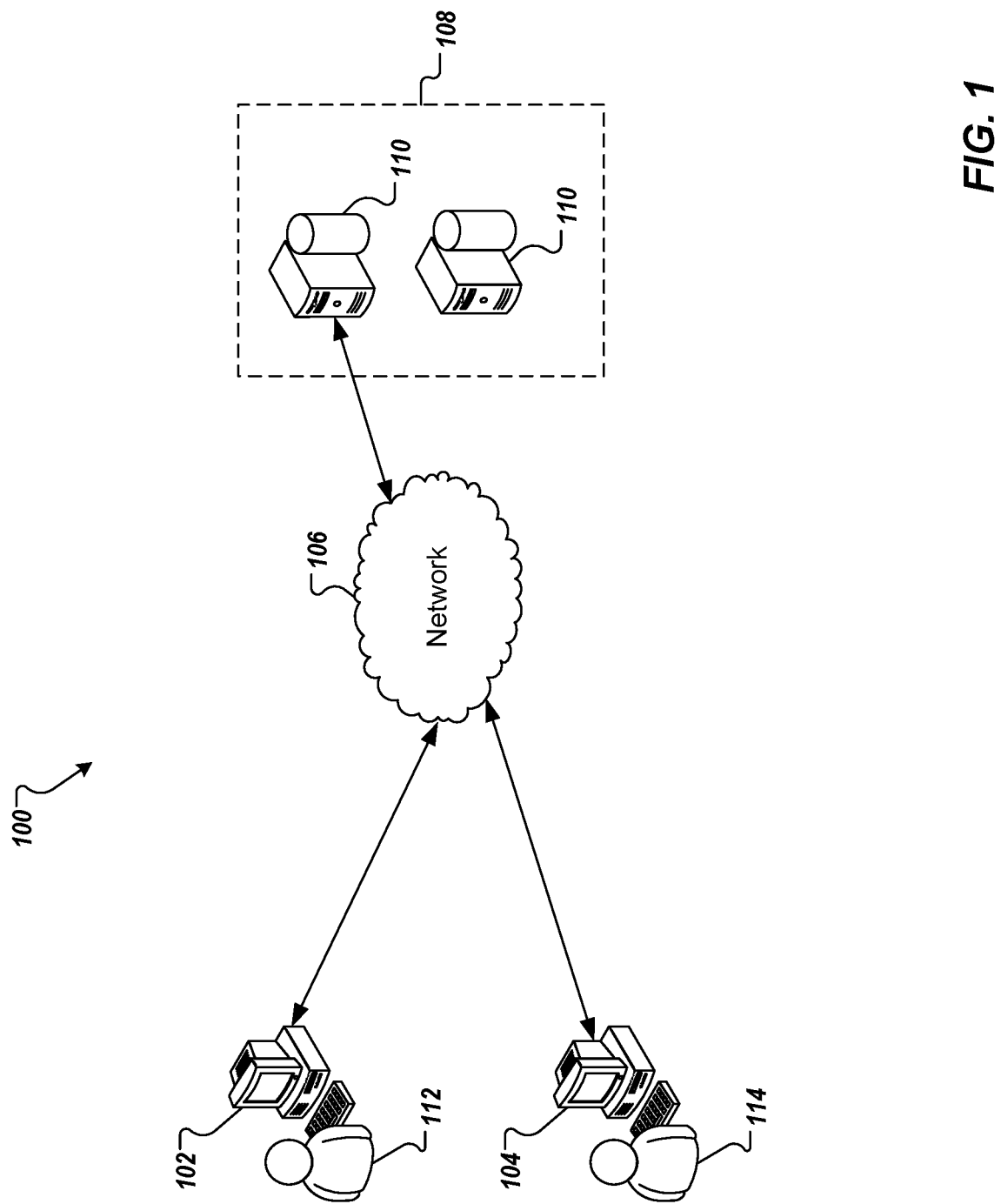
FIG. 1 depicts an example architecture that can be used to execute implementations of the present disclosure.

FIG. 1 depicts an example architecture 100 that can be used to execute implementations of the present disclosure. In the depicted example, the architecture 100 includes one or more client devices 102, 104, a server system 108, and a network 106. The server system 108 includes multiple servers (e.g., processors, memory) and databases (collectively referenced as 110). In the context of the present disclosure, the servers 110 are respective hardware and/or software platforms. In the depicted example, respective users 112, 114 interact with the client devices 102, 104. In an example context, the users 112, 114 can include users (e.g., accountants, lawyers, auditors, engineers), who interact with electronic documents that are hosted by the server system 108.

In some examples, the client devices 102, 104 can communicate with the server system 108 over the network 106.

In some examples, the client devices 102, 104 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server 110 includes at least one server and at least one data store. In the example of FIG. 1, each server 110 is intended to represent various forms of servers including, but not limited to a web server, an application server, a proxy server, a network server, and/or a server pool. In general, servers accept requests for application services and provides such services to any number of client devices (e.g., the client devices 102, 104 over the network 106).

Implementations of the present disclosure are described in further detail herein with reference to an example context. The example context includes an enterprise providing remote access to electronic documents that are hosted on and stored in a server system of the enterprise. In some examples, a server system is operated on behalf of an enterprise. For example, a cloud service provider can host a virtual secure room of the present disclosure on behalf of an enterprise. In some examples, a server system of the enterprise is provided as an on-premise server system, which is directly operated by the enterprise (e.g., as opposed to a server system operated by a third-party on behalf of the enterprise). The server system may have direct and/or indirect connections with one or more other server systems of the enterprise.

Continuing with the example context, one or more users, who are remotely located from, and who are external to the enterprise are to be provided access to the server system, and electronic documents stored therein. As described in further detail herein, a virtual secure room in accordance with implementations of the present disclosure, authenticates users, regulates access to electronic documents (e.g., based on roles), and monitors user activity in an effort to ensure compliance with document review policies.

Figure 2:
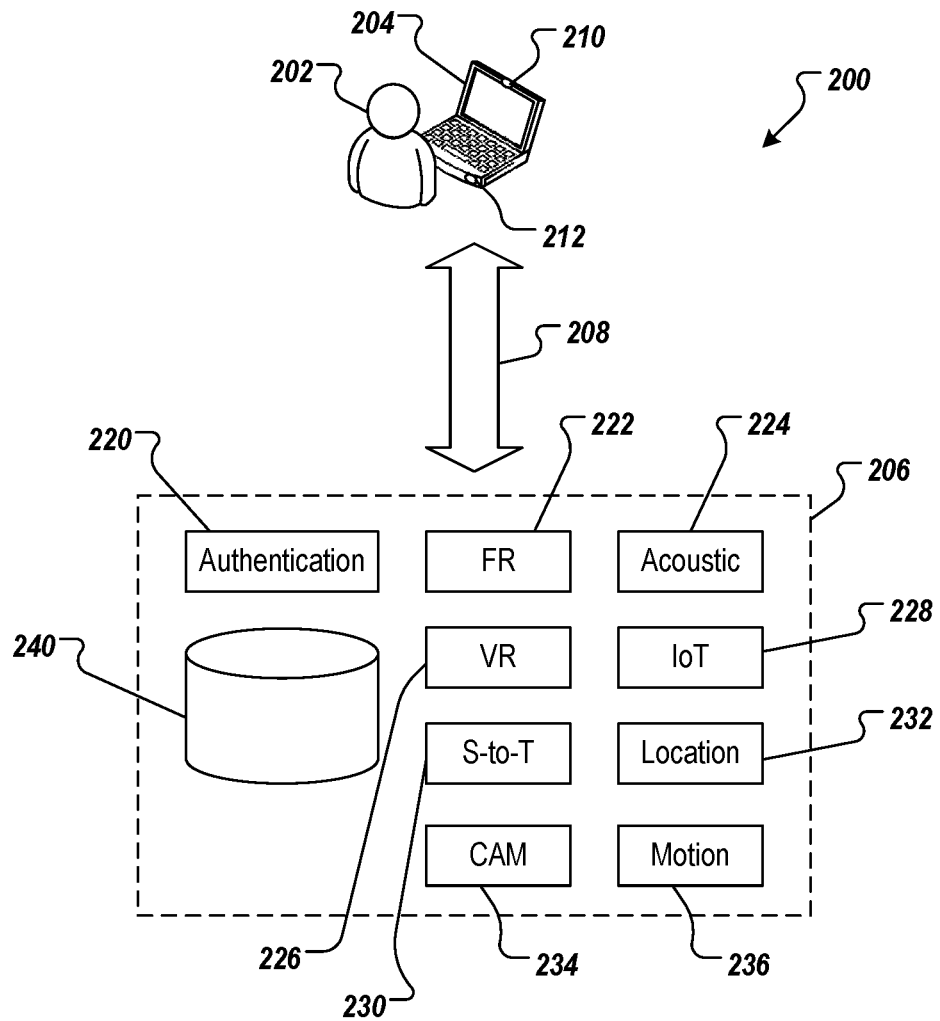
FIG. 2 depicts an example architecture in accordance with implementations of the present disclosure.

FIG. 2 depicts an example architecture 200 in accordance with implementations of the present disclosure. The example architecture 200 includes a computing device 204, used by a user 202, that communicates with a virtual secure room 206 over a network 208. In some examples, the computing device 204 corresponds to a client device 102, 104 of FIG. 1, and the network 208 corresponds to the network 106 of FIG. 1. In some examples, the virtual secure room 206 is hosted by the server system 108 of FIG. 1, which is operated by, or on behalf of an enterprise. In accordance with the example context, the user 202 is to review electronic documents through the virtual secure room 206, which electronic documents are hosted on the server system.

In the depicted example, the computing device 204 is provided as a laptop computer. It is contemplated, however, that any appropriate computing device can be used. The computing device 204 includes a camera 210, and a microphone 212. In some examples, the camera 210, and/or the microphone 212 capture data representative of an environment that the computing device 204 is located in. For example, the camera 210 can capture digital images and/or video depicting at least a portion of the environment that the computing device 204 is located in, and the microphone 212 can capture audio that can be heard within the environment that the computing device 204 is located in. In some examples, the camera 210, and/or the microphone 212 capture data representative of the user 202. For example, the camera 210 can capture digital images and/or video of the user 202, and the microphone 212 can capture audible noises generated by the user (e.g., voice, movement). It is contemplated that the computing device 204 can include any appropriate ancillary devices for capturing data. For example, the computing device 204 can include a fingerprint scanner (not shown), which can provide data representative of a fingerprint of the user 202.

In some implementations, the virtual secure room 206 is provided as one or more computer-executable programs that are executed by the server system. In some examples, the virtual secure room 206 includes one or more databases stored in computer-readable/-writable memory. In the depicted example, the virtual secure room 206 includes an authentication module 220, a facial recognition module 222, an acoustics module 224, a voice recognition module 226, an Internet-of-Things (IoT) module 228, a speech-to-text (S-to-T) module 230, a location module 232, a client activity module (CAM) 234, and a motion detection module (236). In some examples, each module 220, 222, 224, 226, 228, 230, 232, 234, 236 is provided as one or more computer-executable programs. In the depicted example, the virtual secure room 206 includes a database 240. In some examples, the database 240 is provided using one or more computer-executable programs, and stores data in computer-readable/-writable memory. In some implementations, one or more of the modules 220, 222, 224, 226, 228, 230, 232, 234, 236 is provided external to, but is accessed by the virtual secure room 206 for the provided functionality. For example, the authentication module 220 can be external to the virtual secure room 206, and can receive authentication requests from the virtual secure room 206 in an effort to authenticate users, as described in further detail herein.

In some examples, the computing device 204 is not provided by the enterprise that is providing access to the electronic documents hosted by the server system. For example, the computing device 204 can be provided by an employer of the user 202, which employer is not the enterprise. As another example, the computing device 204 can be a personal device of the user 202 (e.g., in a bring-your-own-device (BYOD) paradigm).

In some implementations, the computing device 204 executes a client-side portal that enables access to the virtual secure room 206 over the network 208. For example, the client-side portal can include a web-based portal that is provided using a browser executing on the computing device 204. As another example, the client-side portal can be an application that is executed by the computing device 204.

In accordance with implementations of the present disclosure, the user 202 logs into the virtual secure room 206 through the computing device 204. For example, the client-side portal provides an authentication interface, through which the user 202 can provide authentication data. Example authentication data can include credentials (e.g., username, password), and/or biometric data (e.g., face, voice, fingerprint).

In some implementations, one or more user profiles are established for users that are registered to access the virtual secure room 206. For example, the user profiles can be stored in the database 240, or any appropriate datastore that is accessible by the virtual secure room 206. In some examples, each user profile includes authentication information that can be used to authenticate a respective user. For example, the user profile can include, without limitation, a username, a password, a personal identification number (PIN) (e.g., each selected by or assigned to the user). In some examples, the user profile can include biometric data corresponding to one or more biometric authentication forms. In some examples, users may be required to be authenticated based on one or more authentication forms, and, for each biometric authentication form, provide respective biometric data. Example biometric authentication forms include, without limitation, facial recognition (FR), voice recognition (VR), fingerprint recognition, iris recognition, retina recognition, hand geometry recognition, and vein recognition. For example, besides authentication based on credentials (e.g., username, password), the enterprise operating the virtual secure room 206 may require user authentication based on facial recognition, and/or voice recognition. Consequently, the user can provide (e.g., during an enrollment session) biometric data to enable facial recognition (e.g., one or more images of the user's face), and/or voice recognition (e.g., one or more voice samples).

In some examples, the user can use the computing device 204 to provide user credentials (e.g., username, password), which can be used by the authentication module 220 to authenticate the user 202. For example, a request can be sent from the computing device 204 to the server system (e.g., over the network 208), the request including the credentials. If the credentials that the user provides match credentials that the server system has stored, the user 202 is determined to be authenticated, and is able to access the virtual secure room 206. That is, for example, a secure session is established between the computing device of the user and the server system (e.g., using secure sockets layer (SSL), transport layer security (TLS)). In this manner, data that is communicated between the computing device 202 and the virtual secure room 206 is encrypted for transmission.

In some implementations, the authentication is at least partially based on a unique identifier of and/or a token stored on the computing device 204 that the user 202 is using to access the server system. For example, a request can be sent from the computing device 204 of the user to the server system (e.g., over the network 208), the request including the credentials and the unique identifier of and/or the token stored on the computing device 204. If the credentials match credentials that the server system has stored, and the unique identifier matches a unique identifier associated with the user profile stored at the server system and/or the token is determined to be authentic, the user is determined to be authenticated, and is able to access the service.

In some implementations, authentication is at least partially based on biometric data. For example, authentication can be based on facial recognition and/or voice recognition. For facial recognition, the user 202 can use the authentication interface to enable one or more images of the user's face to be captured (e.g., using the camera 210 of the computing device 204). In some examples, each of the one or more images is encrypted for transmission over the network 208. In some examples, the image quality is compressed for efficient data transfer (e.g., compressed up to 80% at 640× 480 resolution). In some examples, the camera 210 of the computing device 204 is automatically activated to capture images in response to user submission of credentials. For voice recognition, the user 202 can use the authentication interface to capture an audio recording of the user's voice (e.g., using the microphone 212 of the computing device 204). In some examples, voice recognition is based on a voice sample of limited duration (e.g., 15 seconds). In this manner, authentication data can be efficiently transferred over the network 208.

In some examples, a facial profile and/or voice profile can be provided based on the biometric data submitted by the user 202 in attempting to access the virtual secure room 206. For example, the facial profile and voice profile include data representative of a facial pattern (facial features), and a voice pattern (vocal features), respectively. In some examples, the facial pattern is provided as a mathematical representation of the relative position, size, and/or shape of facial features (e.g., eyes, nose, cheekbones, jaw). In some examples, the voice pattern is based on a sound spectrogram, which includes a graph that plots a frequency (on the vertical axis) over time (on the horizontal axis). In some examples, different speech sounds create different shapes within the spectrogram.

A known facial pattern and a known voice pattern can be stored in computer-readable memory (e.g., with the user profile), and can represent respective ground-truth facial pattern and voice pattern for the user 202. Subsequent facial image capture and speech capture of the user 202 can be used to provide a facial pattern and a voice pattern, respectively, which can be compared to the known facial and voice patterns. If the patterns sufficiently match the respective, known pattern, the user can be at least partially authenticated. That is, the user 202 may be determined to be authentic (i.e., the user is determined to be who they purport to be) from the perspective of facial and/or voice recognition, but a full authentication may depend on additional authentication perspectives (e.g., user credentials).

In some examples, each pattern (e.g., facial, voice) can be provided as a multi-dimensional vector that is representative of an underlying representation (e.g., mathematical representation, spectrogram). In some examples, patterns can be compared based on a dot product of the respective vectors. For example, a current vector of a pattern can be provided based on data currently received by the server system (e.g., facial and/or voice data captured as the user 202 attempts to log on). A known vector of a known pattern (e.g., stored in computer-readable memory) can be compared to the current vector based on a dot product. In some examples, the dot product results in a value being provided, the value indicating a degree of difference between the current vector and the known vector. In some examples, the value can range between −1 and 1. For example, if the resultant value of the dot product is 1, the vectors, and thus the underlying user, are determined to be identical, and if the dot product is −1, the vectors, and thus the underlying user, are determined not to be the same. In some examples, a threshold can be provided, such that, if the resultant value of the dot product exceeds the threshold, the vectors are determined to be sufficiently similar to determine that the user is authentic.

In summary, the user 202 can provide authentication data to the server system, which authentication data can include credentials, and/or biometric data. The server system can execute user authentication protocols to authenticate the user 202 for access to the virtual secure room 206 based on the credentials, and/or biometric authentication. If the user 202 cannot be authenticated based on the provided authentication data, the user 202 is denied access to the virtual secure room 206. If the user is authenticated based on the provided authentication data, the user 202 is allowed access to the virtual secure room 206.

In some implementations, the user 202 can be associated with a respective role. In some examples, roles can be used to define a scope of information that the user 202 is allowed access to. For example, a first role (e.g., manager) can be considered more secure than a second role (e.g., document reviewer). Consequently, a first user assigned to the first role may be able to access more information than a second user assigned to a second role.

By way of one non-limiting example, an electronic document can be associated with role metadata, which defines one or more roles that are allowed to access the electronic document. For example, the role metadata can indicate that the first role is allowed access, but either indicate that the second role is not allowed access, or be silent as to the second role. The first user may be granted access to the electronic document in view of the first role, while the second user is denied access to the electronic document in view of the second role.

By way of a second non-limiting example, role metadata can define one or more roles that are allowed to view respective types of information within electronic documents. For example, a first type of information (e.g., personally identifiable information (PII)) can be more sensitive than a second type of information (e.g., non-PII information). Role metadata can indicate that the first role is allowed to access any type of information, while the second role is only allowed to access the second type of information. In some examples, if an electronic document includes both the first type and the second type of information, the first user is able to view the electronic document, and both the first type and the second type of information provided therein. On the other hand, although the second user is able to view the electronic document, only the second type of information is made viewable (e.g., information of the first type is obscured/redacted from view). In some examples, a computer-implemented redaction service can process an electronic document based on a role of a user requesting access to the document, and can provide a redacted version of the electronic document for display to the user. In some examples, a computer-implemented watermarking service can process an electronic document to provide a digital watermark therein (e.g., a visible watermark). In some examples, the digital watermark can include information therein (e.g., encoded information). Example information can include an identifier user assigned to the user accessing the electronic document, and/or enterprise name (e.g., the user's employer). In some examples, the digital watermark can be used as a trackable identifier if any pictures/printouts/copies of the screen are made.

In some implementations, before the user 202 is able to access any electronic documents within the virtual secure room 206, a location of the computing device 204, and/or a network connectivity of the computing device 204 can be determined, and access to the virtual secure room 206 can be controlled based thereon. In some examples, a location of the computing device 204 can be based on one or more network signals indicating a network that the computing device 204 is connected to. In some examples, the network can be associated with a unique identifier, which can be used to determine a location of the network, and thus the computing device 204. For example, the unique identifier can be provided as input to a look-up table, which provides a location of the network. In some examples, if the location indicates that the computing device 204 is at a particular type of location (e.g., a public business, such as a coffee shop) access to the virtual secure room 206 can be shut down. In this manner, the user 202 is inhibited from viewing electronic documents in the virtual secure room, while in unsecure locations (e.g., public locations).

In some implementations, the user profile associated with the user 202 can provide a list of approved locations (e.g., home, office), from which the user 202 is allowed to access the secure data room 206. In some examples, the location of the computing device 204 can be determined, and can be compared to locations in the list of approved locations. If the location matches a location in the list of approved locations, the computing device 204 is able to continue communication with the virtual secure data room 206. If the location does not match a location in the list of approved locations, the computing device 204 is unable to continue communication with the virtual secure data room 206.

In some implementations, the user 202 is monitored during interactions with the virtual secure room 206. In some implementations, a user state and/or actions are monitored to determine whether the user 202 is acting in conformance with one or more policies that determine allowed and/or disallowed state(s) and/or activit(y/ies) by the user. Example disallowed states can include an absence of the user 202, and a second person being in the presence of the computing device 204. Example allowed states can include a presence of the user 202, and solitude of the user 202 (e.g., no one else is present). Example allowed activities can include interacting with the computing device 204 (e.g., viewing a display, typing, mouse use, trackpad use) to review electronic documents displayed thereon. Example of disallowed activities can include interacting with a second person, using a device (e.g., computer, tablet, smartphone, telephone, camera) other than the computing device 204, using writing instruments (e.g., pen and paper), and the like. In some implementations, one or more states and/or actions of the user 202 are monitored using one or more ancillary devices. In some examples, an ancillary device can be a device of the computing device 204 (e.g., the camera 210, the microphone 212). In some examples, an ancillary device can be independent of the computing device 204 (e.g., a camera, a microphone, a smartphone, a tablet, any appropriate IoT device).

In accordance with implementations of the present disclosure, a state can be determined based on image, video, and/or sound. In some examples, and as described in further detail herein, face detection, facial recognition, voice detection, and/or voice recognition can be used individually, or in combination, to determine a state.

As one example, a camera (e.g., the camera 210) can capture image data (e.g., an image, a video as a series of images (frames)), and can process the image data to perform face detection (e.g., the presence of a face in the image). For example, the FR module 222 can process the image data to determine a number of faces in the underlying image. In some examples, if no faces are detected, it can be determined that a disallowed state is occurring (e.g., absence of the user 202). In some examples, if multiple faces are detected, it can be determined that a disallowed state is occurring (e.g., multiple users are present). In some examples, the image data can be further processed to provide facial recognition to determine an identity of the face. For example, if facial recognition indicates that one face is detected, but the face is not that of the user 202, a disallowed state is occurring (e.g., the user 202 is logged in, but is not the user currently interacting with the computing device 204).

As another example, a microphone (e.g., the microphone 212) can record sound and provide sound data, which can be processed to perform voice detection (e.g., the presence of a voice). For example, the VR module 226 can process the voice data to determine a number of voices in the underlying audio. In some examples, if no voices are detected, it can be determined that an allowed state is occurring (e.g., the user 202 is working in silence). In some examples, if multiple voices are detected, it can be determined that a disallowed state is occurring (e.g., multiple users are present). In some examples, the voice data can be further processed to provide voice recognition to determine an identity of the voice. For example, if voice recognition indicates that one voice is detected, but the voice is not that of the user 202, a disallowed state is occurring (e.g., the user 202 is logged in, but is not the user currently interacting with the computing device 204).

In accordance with implementations of the present disclosure, an activity can be determined based on image, video, and/or sound. In some examples, and as described in further detail herein, motion detection, voice detection, voice recognition can be used individually, or in combination, to determine an activity.

As one example, a camera (e.g., the camera 210) can capture image data (e.g., an image, a video as a series of images (frames)), and can process the image data to perform motion detection (e.g., movement of the user). For example, the motion detection module 236 can process the image data to determine a movement of the user 202. In some examples, the movement of the user 202 can be compared to one or more known movements to determine whether a violation has occurred. For example, one or more known movements can be represented in respective movement profiles, to which the current movement of the user 202 can be compared. In some examples, the current movement of the user 202, and the known movements can each be quantified as a multi-dimensional vector. The vector of the current movement can be compared to each of the vectors of the known movements (e.g., using dot product, as described herein) to determine whether the current movement sufficiently matches a known movement. If the current movement sufficiently matches a known movement, it can be determined whether the known movement corresponds to an allowed or disallowed activity. For example, writing (e.g., writing using pen and paper) can be a known movement that is a disallowed activity. As another example, using an ancillary device (e.g., smartphone) can be a known movement that is a disallowed activity. As another example, stretching can be a known movement that is an allowed activity. In some examples, the movement profiles can each included metadata indicating whether the movement corresponds to an allowed or disallowed activity.

In some implementations, a current movement can be used in combination with activity on the computing device 204 to determine whether a violation is occurring. For example, a current movement can be determined and compared to a known movement, as described herein. Activity of the computing device 204 that occurs contemporaneously with the current movement can be determined. For example, the computing device 204 can continuously transmit activity data to the secure data room 206, which activity data is representative of activities conducted by the user on the computing device 204 (e.g., typing, scrolling, mouse pointer movement). The activity data can be process (e.g., by the CAM module 234) to determine activity of the computing device 204. In some examples, if the current movement does not correspond to activity of the computing device 204, it can be determined that a violation has occurred. For example, the current movement can be determined to correspond to keyboard typing (e.g., a known movement), but the contemporaneous activity data indicates that no input was provided through a keyboard of the computing device 204. This can indicate that the user 202 is typing into a keyboard of another computing device, a disallowed activity, and is therefore, determined to be a violation. As another example, the current movement can be determined to correspond to movement of a mouse (e.g., a known movement), and the contemporaneous activity data indicates that a mouse pointer is moving within the display of the computing device 204. This can indicate that the user 202 is moving the mouse of the computing device 204, an allowed activity, and is therefore, determined not to be a violation.

In some implementations, if a violation is detected (e.g., a disallowed state and/or activity is detected) during user interaction with the virtual secure room 206, the connection with the virtual secure room 206 can be interrupted. In some examples, the connection is immediately interrupted without notice to the user 202. In some examples, a notification is transmitted to the user 202 (e.g., informing the user 202 that a violation has occurred), and the connection is interrupted. In some examples, the user 202 is afforded an opportunity to correct the violation before interruption of the connection. For example, a notification can be transmitted to the user 202 informing the user 202 that a violation has occurred, and that the connection will be interrupted, if the violation is not corrected (e.g., We have noticed that you are taking notes. If you continue to take notes, you will be ejected from the secure room).

Figure 3:
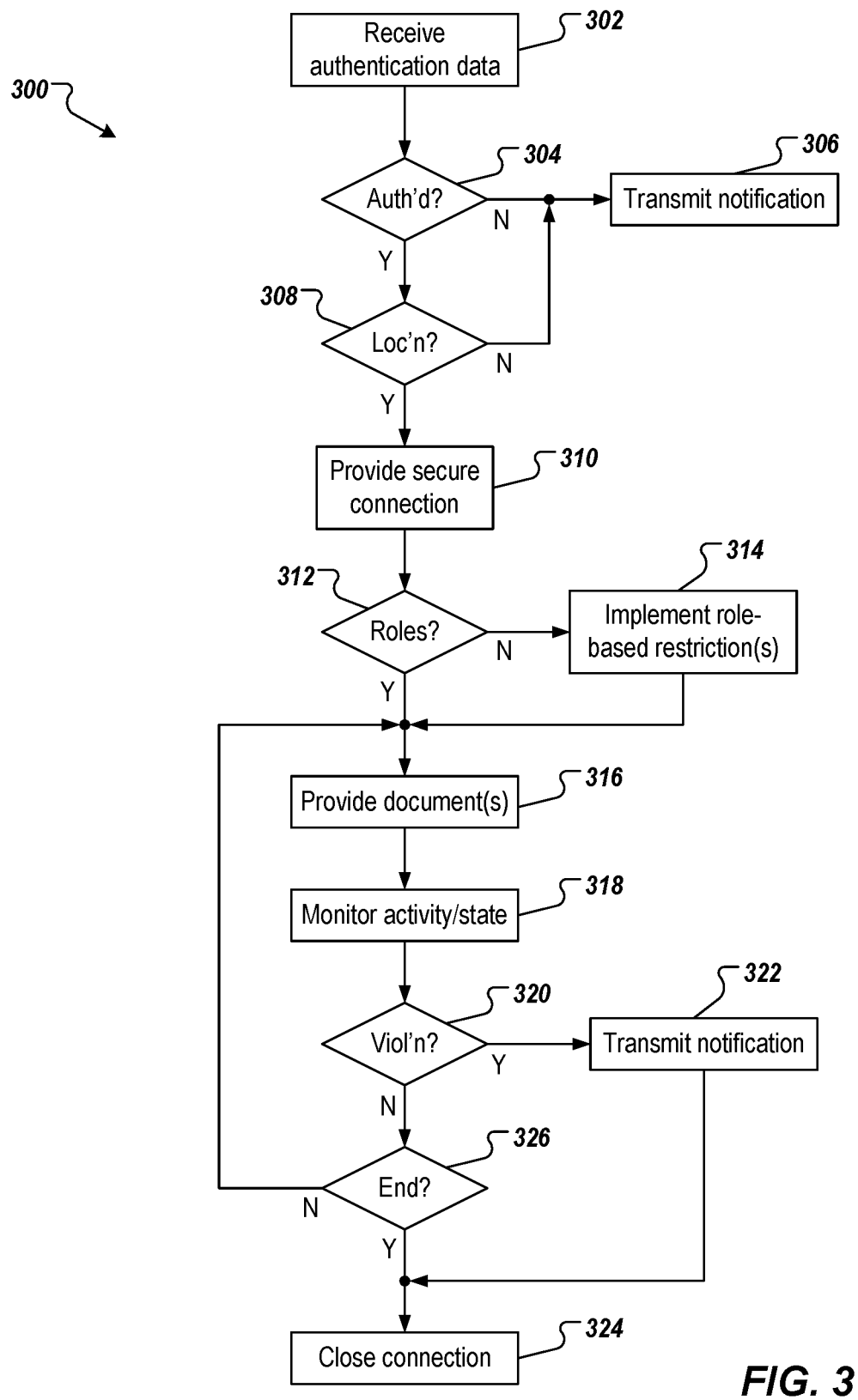
FIG. 3 depicts an example process that can be executed in accordance with implementations of the present disclosure.

FIG. 3 depicts an example process 300 that can be executed in accordance with implementations of the present disclosure. In some implementations, the process 300 can be performed to enable a remotely located user access to electronic documents provide from a server system. In some examples, the process 300 is provided by one or more computer-executable programs executed by one or more computing devices. In some examples, the process 300 can be provided by one or more of the architectures depicted in FIGS. 1 and 2.

Authentication data is received (302). For example, and with reference to FIG. 2, the user 202 uses the computing device 204 to provide authentication data. In some examples, the authentication data includes credentials (e.g., username, password), and/or biometric data (e.g., image(s), video, voice, fingerprint). It is determined whether the user us authenticated (304). For example, the authentication data can be compared to known authentication data (e.g., stored credentials, ground-truth facial recognition and/or voice recognition data) to determine whether the user 202 is who they purport to be. If the user is not authenticated, a notification is transmitted (306). In some examples, the notification can inform the user 202 that they cannot be authenticated, and a connection to the server system is denied.

In some implementations, if the user is authenticated, it is determined whether a current location of the user is an approved location (308). For example, a location of the computing device 204 can be determined, and can be compared to a list of approved locations. If the current location does not correspond to a location in the list of approved locations, it can be determined that the current location is not an approved location. If the current location does correspond to a location in the list of approved locations, it can be determined that the current location is an approved location. If it is determined that the user is not at an approved location, a notification is transmitted (306). In some examples, the notification can inform the user 202 that they are not at an approved location, and a connection to the server system is denied.

If it is determined that the user is at an approved location, a secure connection to a virtual secure room is established (310). For example, an SSL/TSL connection is established between the computing device 204 and the virtual secure room 206 over the network 208. In some examples, a session is instantiated, during which the user 202 can submit requests to and receive responses from the virtual secure room 206. In some implementations, it is determined whether data access is to be regulated based on a role of the user (312). For example, a setting of the virtual secure room 206 can indicate whether a role assigned to the user 202 is to be considered in determining electronic documents and/or data the user 202 is to be provided access to. If data access is to be regulated based on a role of the user, role-based restrictions are implemented during the session (314). For example, a role of the user 202 can be determined (e.g., from a user profile associated with the user 202), and which electronic documents, and/or data within electronic documents can be regulated based on the role, as described herein.

One or more electronic documents are provided (316). For example, the virtual secure room 206 can provide an electronic document for presentation to the user 202 on the computing device 204. In some examples, the electronic document is provided in response to determining that the user 202 is allowed to view the electronic document based on the role of the user 202, as described herein. In some examples, the electronic document is provided as a redacted electronic document including redactions to information provided in the electronic document, the redactions being provided based on the role of the user 202, as described herein.

Activity and/or state of the user is monitored (318). For example, and as described in further detail herein, one or more ancillary devices, and/or the computing device 204 itself provides data representative of user activity and/or state. The data can be processed, as described herein, or in any appropriate manner, to determine whether an activity of the user corresponds to an allowed or disallowed activity, and/or whether a state of the user corresponds to an allowed or disallowed state. It is determined whether a violation is/has occurring/occurred (320). For example, it is determined whether a detected activity and/or state corresponds to a disallowed activity and/or state. If a detected activity and/or state corresponds to a disallowed activity and/or state, it is determined that a violation is/has occurring/ occurred. If a violation has occurred, a notification is transmitted (322), and the connection is closed (324). For example, a notification is transmitted to the computing device 204, and the connection between the computing device 204, and the virtual secure room 206 is closed. If a violation has not occurred, it is determined whether the session is ended (326). For example, the user 202 can log out of the virtual secure room 206 indicating that the session has ended. If the session has not ended, the example process 300 loops back. If the session has ended, the connection is closed (324).

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the architectures 100, 200 of FIGS. 1 and 2, respectively, can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs (i.e., one or more modules of computer program instructions) encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA (field programmable gate array) or an ASIC (application specific integrated circuit)). The apparatus can also include, in addition to hardware, code that creates an execution environment for the computer program in question (e.g., code that constitutes processor firmware), a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA, an ASIC).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the invention. Accordingly, other embodiments are within the scope of the following claims.

What is claimed is:

1. A computer-implemented method for providing remote access to electronic documents stored in a server system using a virtual secure room, the method comprising:
   authenticating, by one or more processors, a user at least partially based on credentials the user;
   at least partially in response to authenticating the user, providing, by the one or more processors, a secure connection between a computing device of the user and the server system;
   transmitting, by the one or more processors, at least one electronic document for display to the user on the computing device;
   monitoring, by the one or more processors and from a microphone of the computing device and from a camera of the computing device, the user while the at least one electronic document is displayed to the user on the computing device;
   detecting, by the one or more processors and based on the monitoring, one or more disallowed activities comprising one or more of: using a device other than the computing device or using a writing instrument; and
   selectively closing, by the one or more processors, the secure connection in response to the detecting.

2. The method of claim 1, further comprising determining content to be available for display to the user based on a role of the user, the at least one electronic document comprising at least a portion of the content.

3. The method of claim 2, wherein at least a portion of the at least one electronic document is redacted based on the role of the user.

4. The method of claim 1, wherein detecting one or more disallowed activities of the user comprises analyzing one or more movements of the user.

5. The method of claim 1, further comprising monitoring the user from an ancillary device that is independent of the computing device.

6. The method of claim 1, wherein detecting one or more disallowed activities of the user comprises analyzing audio data captured by the microphone and determining a number of voices represented by the audio data.

7. The method of claim 1, further comprising detecting one or more disallowed states of the user, the one or more disallowed states comprising an absence of the user from the computing device.

8. The method of claim 1, wherein detecting one or more disallowed activities of the user comprises comparing one or more movements of the user to one or more known movements.

9. The method of claim 1, further comprising determining a location of the computing device, wherein providing a secure connection between the computing device and the server system is further in response to the location being an approved location.

10. A non-transitory computer-readable storage medium coupled to one or more processors and having instructions stored thereon which, when executed by the one or more processors, cause the one or more processors to perform operations for providing remote access to electronic documents stored in a server system using a virtual secure room, the operations comprising:
   authenticating a user at least partially based on credentials the user;
   at least partially in response to authenticating the user, providing a secure connection between a computing device of the user and the server system;
   transmitting at least one electronic document for display to the user on the computing device;

monitoring, from a microphone of the computing device and from a camera of the computing device, the user while the at least one electronic document is displayed to the user on the computing device;

detecting, based on the monitoring, one or more disallowed activities comprising one or more of: using a device other than the computing device or using a writing instrument; and selectively closing the secure connection in response to the detecting.

11. The computer-readable storage medium of claim 10, wherein operations further comprise determining content to be available for display to the user based on a role of the user, the at least one electronic document comprising at least a portion of the content.

12. The computer-readable storage medium of claim 11, wherein at least a portion of the at least one electronic document is redacted based on the role of the user.

13. The computer-readable storage medium of claim 10, wherein detecting one or more disallowed activities of the user comprises analyzing one or more movements of the user.

14. The computer-readable storage medium of claim 10, the operations further comprising monitoring the user from an ancillary device that is independent of the computing device.

15. The computer-readable storage medium of claim 10, wherein detecting one or more disallowed activities of the user comprises analyzing audio data captured by the microphone and determining a number of voices represented by the audio data.

16. The computer-readable storage medium of claim 10, the operations further comprising detecting one or more disallowed states of the user, the one or more disallowed states comprising an absence of the user from the computing device.

17. The computer-readable storage medium of claim 10, wherein detecting one or more disallowed activities of the user comprises comparing one or more movements of the user to one or more known movements.

18. The computer-readable storage medium of claim 10, wherein the operations further comprise determining a location of the computing device, wherein providing a secure connection between the computing device and the server system is further in response to the location being an approved location.

19. A system, comprising:
one or more processors; and
a computer-readable storage device coupled to the one or more processors and having instructions stored thereon which, when executed by the one or more processors, cause the one or more processors to perform operations for providing remote access to electronic documents stored in a server system using a virtual secure room, the operations comprising:

authenticating a user at least partially based on credentials the user;

at least partially in response to authenticating the user, providing a secure connection between a computing device of the user and the server system;

transmitting at least one electronic document for display to the user on the computing device;

monitoring, from a microphone of the computing device and from a camera of the computing device, the user while the at least one electronic document is displayed to the user on the computing device;

detecting, based on the monitoring, one or more disallowed activities comprising one or more of: using a device other than the computing device or using a writing instrument; and selectively closing the secure connection in response to the detecting.

20. The system of claim 19, wherein operations further comprise determining content to be available for display to the user based on a role of the user, the at least one electronic document comprising at least a portion of the content.

21. The system of claim 20, wherein at least a portion of the at least one electronic document is redacted based on the role of the user.

22. The system of claim 19, wherein detecting one or more disallowed activities of the user comprises analyzing one or more movements of the user.

23. The system of claim 19, the operations further comprising monitoring the user from an ancillary device that is independent of the computing device.

24. The system of claim 19, wherein detecting one or more disallowed activities of the user comprises analyzing audio data captured by the microphone and determining a number of voices represented by the audio data.

25. The system of claim 19, the operations further comprising detecting one or more disallowed states of the user, the one or more disallowed states comprising an absence of the user from the computing device.

26. The system of claim 19, wherein detecting one or more disallowed activities of the user comprises comparing one or more movements of the user to one or more known movements.

27. The system of claim 19, wherein the operations further comprise determining a location of the computing device, wherein providing a secure connection between the computing device and the server system is further in response to the location being an approved location.

* * * * *

UNITED STATES PATENT AND TRADEMARK OFFICE
CERTIFICATE OF CORRECTION

PATENT NO. : 10,831,805 B1
APPLICATION NO. : 15/803500
DATED : November 10, 2020
INVENTOR(S) : Thomas Bret Buckingham et al.

Page 1 of 1

It is certified that error appears in the above-identified patent and that said Letters Patent is hereby corrected as shown below:

In the Specification

Column 1, Line 7, delete "No." and insert -- Nos. --, therefor.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*